(12) United States Patent
Yen et al.

(10) Patent No.: US 11,182,506 B2
(45) Date of Patent: *Nov. 23, 2021

(54) INTELLIGENT PLATFORM

(71) Applicant: devicebook Inc., Bellevue, WA (US)

(72) Inventors: Wei Yen, Bellevue, WA (US);
Raymond Lo, Bellevue, WA (US);
Wingshun Ho, Bellevue, WA (US);
Sourabh Ladha, Bellevue, WA (US);
John Masin, Bellevue, WA (US)

(73) Assignee: devicebook Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/279,965

(22) Filed: Feb. 19, 2019

(65) Prior Publication Data
US 2019/0205553 A1 Jul. 4, 2019

Related U.S. Application Data

(63) Continuation of application No. PCT/US2018/021641, filed on Mar. 9, 2018, which is a continuation-in-part of application No. 15/454,893, filed on Mar. 9, 2017, now Pat. No. 10,437,609.

(60) Provisional application No. 62/476,391, filed on Mar. 24, 2017.

(51) Int. Cl.
| G06F 21/62 | (2013.01) |
| G06F 3/0481 | (2013.01) |
| H04L 12/28 | (2006.01) |
| G06F 9/54 | (2006.01) |
| G06F 13/10 | (2006.01) |
| G06F 8/34 | (2018.01) |

(52) U.S. Cl.
CPC ........ *G06F 21/629* (2013.01); *G06F 3/04817* (2013.01); *G06F 8/34* (2013.01); *G06F 9/54* (2013.01); *G06F 13/102* (2013.01); *H04L 12/2814* (2013.01)

(58) Field of Classification Search
CPC ............. G06F 9/44505; G06F 21/6218; G06F 21/629; G06F 3/04817; G06F 8/34; G06F 9/54; G06F 13/102; H04L 12/2814
USPC .............................................. 718/1; 711/170
See application file for complete search history.

(56) References Cited

U.S. PATENT DOCUMENTS

| 9,143,509 | B2 * | 9/2015 | Rose ........................ G06F 21/74 |
| 9,213,540 | B1 * | 12/2015 | Rickey .................... G06Q 10/00 |
| 9,864,873 | B2 * | 1/2018 | Guinan .................... H04L 9/321 |
| 10,148,496 | B2 * | 12/2018 | Tiwari ................ H04L 41/0806 |
| 10,437,609 | B1 * | 10/2019 | Yen ....................... G06F 9/44505 |

(Continued)

FOREIGN PATENT DOCUMENTS

EP  1 276 035 A2  1/2003

OTHER PUBLICATIONS

Citius Minds, "The IP of Iot—Top 5 Companies and how their IP Pans out," Dec. 2016, 24 pages.

(Continued)

*Primary Examiner* — Aurel Prifti
(74) *Attorney, Agent, or Firm* — Nixon & Vanderhye PC

(57) ABSTRACT

An Intelligent Platform ("IP") comprises a Platform that employs an instance of a Software Defined Device (I-SDD) such that the Values of a set of Variables in an I-SDD shall reflect the Device State of interest at any given time. Whenever the Value of a Variable in I-SDD is changed, it could cause the Device to change to a different Device State.

18 Claims, 9 Drawing Sheets

(56) References Cited

U.S. PATENT DOCUMENTS

| | | | | |
|---|---|---|---|---|
| 2007/0255659 | A1* | 11/2007 | Yen | G06F 21/10 705/51 |
| 2008/0028083 | A1* | 1/2008 | Rezvani | H04L 47/263 709/229 |
| 2009/0097397 | A1* | 4/2009 | Moreira Sa de Souza | H04L 41/0636 370/216 |
| 2010/0106262 | A1* | 4/2010 | Schreyer | G06F 9/54 700/28 |
| 2011/0119669 | A1* | 5/2011 | McRae | G06F 9/45558 718/1 |
| 2011/0251992 | A1* | 10/2011 | Bethlehem | H04L 67/306 707/610 |
| 2011/0320411 | A1* | 12/2011 | Henderson | G06F 16/27 707/687 |
| 2012/0047435 | A1* | 2/2012 | Holladay | H04R 27/00 715/716 |
| 2012/0311290 | A1* | 12/2012 | White | G05B 23/0264 711/170 |
| 2014/0282421 | A1* | 9/2014 | Jubran | G06F 11/3688 717/126 |
| 2016/0188898 | A1* | 6/2016 | Karinta | G06F 16/172 726/4 |
| 2016/0217242 | A1* | 7/2016 | Beaubien | G06F 30/34 |
| 2016/0306628 | A1* | 10/2016 | Bestfleisch | G06F 16/00 |
| 2017/0005515 | A1* | 1/2017 | Sanders | H02J 3/381 |
| 2017/0005856 | A1* | 1/2017 | Thomas | H04L 67/22 |
| 2017/0206025 | A1* | 7/2017 | Viswanathan | H04L 67/1097 |
| 2017/0286910 | A1* | 10/2017 | Botterill | G06Q 10/103 |
| 2017/0302701 | A1* | 10/2017 | Phanse | H04L 63/20 |
| 2018/0109625 | A1* | 4/2018 | Jayaraman | H04L 67/141 |
| 2018/0136815 | A1* | 5/2018 | Tomizuka | G06F 3/04815 |
| 2019/0129729 | A1* | 5/2019 | Peterkofsky | G06F 9/5072 |
| 2019/0132888 | A1* | 5/2019 | Myers, III | H04W 6/10 |
| 2019/0155616 | A1* | 5/2019 | Rainwater | G06F 9/4492 |
| 2019/0156047 | A1* | 5/2019 | Daniel | G06F 9/44505 |
| 2019/0394061 | A1* | 12/2019 | Chen | H04L 67/10 |
| 2020/0065123 | A1* | 2/2020 | Yang | G06F 9/455 |
| 2020/0221268 | A1* | 7/2020 | Wang | G06F 9/541 |
| 2020/0257814 | A1* | 8/2020 | El-Moussa | G06F 21/53 |

OTHER PUBLICATIONS

Fortino, Giancarlo, et al., "Interoperability in the Internet of Things," Computing Now, Dec. 2016, 5 pages.

Office Action dated Nov. 19, 2018 in U.S. Appl. No. 15/454,893.

International Preliminary Report Patentability and Written Opinion of the International Searching Authority for corresponding PCT/US2018/021641, dated Sep. 10, 2019.

* cited by examiner

Platform SDD Publishing

Platform Process

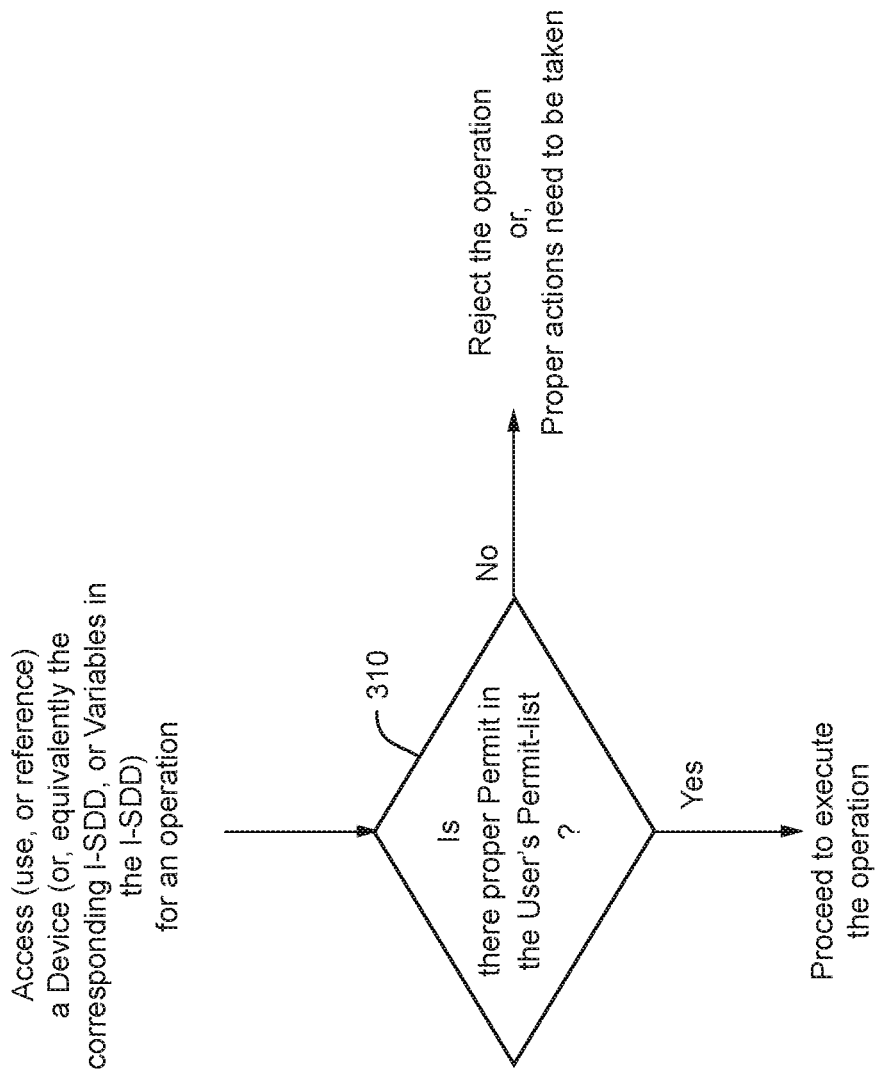

INTELLIGENT PLATFORM

CROSS-REFERENCE TO RELATED APPLICATIONS

This application is a continuation of International Application No. PCT/US2018/021641 filed Mar. 9, 2018; which claims priority from U.S. patent application Ser. No. 15/454,893 filed Mar. 9, 2017 and 62/476,391 filed Mar. 24, 2017, incorporated herein by reference as if expressly set forth.

FIELD

This technology relates to an Intelligent Platform. More generally, the present invention relates to the technical field of controlling networked devices, in particular in a cloud-based and/or Internet of Things environment.

BACKGROUND & SUMMARY

There is a need for an Intelligent Platform that models and mirrors different Devices in software. The following are some non-exhaustive advantageous features of non-limiting embodiments:

In one example non-limiting embodiment, an Intelligent Platform ("IP") comprises a Platform that employs an I-SDD where the Values of a set of Variables in an I-SDD shall reflect the Device State of interest at any given time and vis versa so that whenever the Value of a Variable in the I-SDD is changed, it could cause the Device to change to a different Device State. In this context, an I-SDD is an instantiation of a SDD, or an instantiation of the Device Data Representation of a SDD, of a particular Device. In this context, a Software-Defined Device ("SDD") means a computer software representation, to a User, of a Device, or of a subset of a Device, or of a derivative of a Device, or of an abstraction of a Device, in such a way that computer programs can use, reference, and interpret.

In some non-limiting embodiments, a Device could have one SDD or more than one SDD.

In some non-limiting embodiments, a SDD could be an abstraction of another SDD of the same Device, or a group of SDDs of several Devices.

In some non-limiting embodiments, the IP allows more than just a $1^{st}$-Party (i.e., a Device manufacturer) to create, amend, and update a SDD of a Device. It also allows either a $2^{nd}$-Party, or a $3^{rd}$-Party, or both Parties, to create, amend, and update a SDD of a Device.

In some non-limiting embodiments, a priority scheme is used to determine which Party could overwrite another Party's SDD of a Device.

In some non-limiting embodiments, a Vetting Process is used to determine when a SDD of a Device will become publicly (officially) available in the Platform.

In some non-limiting embodiments, an IP also employs Event Variable(s) or/and Notification Variable(s).

In some non-limiting embodiments, an IP also employs I-SDD Creation.

In some non-limiting embodiments, an IP also employs a Visual Programming.

In some non-limiting embodiments, the Visual Programming employs Trigger.

In some non-limiting embodiments, an IP employs a notion of Permit for security and protection. The Platform enforces such a notion throughout the system.

In some non-limiting embodiments, an IP also employs the notion of Owner.

In some non-limiting embodiments, an IP also employs the action of Issuing.

In some non-limiting embodiments, an IP also employs the action of Granting.

In some non-limiting embodiments, an Ownership could be a Joint-Ownership when there is more than one Owner to an I-SDD. Depending on the type of Joint-Ownership, a Joint-Ownership effectively executes as one Owner, if and only if, but not limited to, when (a) all owners agreed, or (b) majority owners agreed, or (c) any one of the owners agreed, otherwise, the execution (attempt to access the I-SDD) will be rejected by the Platform.

In some non-limiting embodiments, Multiple Owners of an I-SDD could be the result of Granting.

In some non-limiting embodiments, an IP also employs Permit Obtaining and Checking.

The disclosed embodiments contemplate and provide, among other features and without limitation, any and all combinatorial possibilities of the above and/or other features described herein, including for example and without limitation the following:

Claim 1: An Intelligent Platform ("IP") comprising: a Platform employing an instantiation ("I-SDD") of an SDD comprising a computer software representation, to a User, of a Device, or of a subset of a Device, or of a derivative of a Device, or of an abstraction of a Device, in such a way that computer programs can use, reference, and interpret, wherein the I-SDD comprises Values of a set of Variables that reflect the Device State of interest at any given time, so that whenever the Value of a Variable in I-SDD is changed, it causes the Device to change to a different Device State.

Claim 2: The Intelligent Platform or method of operating an Intelligent Platform of Claim 1, and/or 3, and/or 4, and/or 5, and/or 6, and/or 7, and/or 8, and/or 9, and/or 10, and/or 11, and/or 15, and/or 12, and/or 13, and/or 14, and/or 31, and/or 32, and/or 33, wherein a Device has one SDD or more and wherein the SDD is an abstraction of another SDD of the same Device, or a group of SDDs of several Devices.

Claim 3: The Intelligent Platform or method of operating an Intelligent Platform of Claim 1, and/or 2, and/or 5, and/or 6, and/or 7, and/or 8, and/or 9, and/or 10, and/or 11, and/or 15, and/or 12, and/or 13, and/or 14, and/or 31, and/or 32, and/or 33, wherein the IP allows more than just the 1st-Party to create, amend, and update a SDD of a Device, and also allows either the 2nd-Party, or the 3rd-Party, or both Parties, to create, amend, and update a SDD of a Device.

Claim 4: The Intelligent Platform or method of operating an Intelligent Platform of Claim 3 wherein a priority scheme is used to determine which Party can overwrite another Parties' SDD of a Device during the process of Vetting or publishing the (official) SDD.

Claim 5: The Intelligent Platform or method of operating an Intelligent Platform of Claim 1, and/or 2, and/or 3, and/or 4, and/or 6, and/or 7, and/or 8, and/or 9, and/or 10, and/or 11, and/or 15, and/or 12, and/or 13, and/or 14, and/or 31, and/or 32, and/or 33, wherein a Vetting Process is used to determine when a SDD of a Device will become publicly (officially) available in the Platform.

Claim 6: The Intelligent Platform or method of operating an Intelligent Platform of Claim 1, and/or 2, and/or 3, and/or 4, and/or 5, and/or 7, and/or 8, and/or 9, and/or 10, and/or 11, and/or 15, and/or 12, and/or 13, and/or 14, and/or 31, and/or 32, and/or 33, wherein the IP also employs Event Variable(s) or/and Notification Variable(s).

Claim 7: The Intelligent Platform or method of operating an Intelligent Platform of Claim 1, and/or 2, and/or 3, and/or 4, and/or 5, and/or 6, and/or 8, and/or 9, and/or 10, and/or 11, and/or 15, and/or 12, and/or 13, and/or 14, and/or 31, and/or 32, and/or 33, wherein the IP also employs I-SDD Creation.

Claim 8: The Intelligent Platform or method of operating an Intelligent Platform of Claim 1, and/or 2, and/or 3, and/or 4, and/or 5, and/or 6, and/or 7, and/or 9, and/or 10, and/or 11, and/or 15, and/or 12, and/or 13, and/or 14, and/or 31, and/or 32, and/or 33, wherein the IP also employs Visual Programming.

Claim 9: The Intelligent Platform or method of operating an Intelligent Platform of Claim 8 wherein the Visual Programming employs a Trigger.

Claim 10: The Intelligent Platform of Claim 1, and/or 2, and/or 3, and/or 4, and/or 5, and/or 6, and/or 7, and/or 8, and/or 9, wherein the IP employs a Permit for security and protection and enforces such a Permit throughout the system.

Claim 11: The Intelligent Platform of Claim 10, and/or 15, wherein the IP also employs Owner and wherein the very first User who first bonds/registers a physical Device into the IP becomes the owner of a resulting I-SDD software representation of the corresponding Device of interest.

Claim 15: The Intelligent Platform or method of operating an Intelligent Platform of Claim 10, and/or 11, and/or 12, and/or 13, and/or 14, and/or 31, and/or 32, and/or 33, wherein the IP also employs Permit Obtaining and Checking wherein the Permit shall be obtained from a User and checked at every instance of a Program execution at any given time before an I-SDD is accessed or referenced each and every time.

Claim 12: The Intelligent Platform of Claim 11, and/or 13, and/or 14, wherein the IP also employs the action of Issuing wherein an Owner of an I-SDD can Issue a Permit to an User in the IP to access, to use, to manipulate, to reference, the I-SDD in a manner allowed by the type of the issued Permit.

Claim 13: The Intelligent Platform or method of operating an Intelligent Platform of Claim 11, and/or 12, and/or 14, and/or 31, and/or 32, and/or 33, wherein the IP also employs the action of Granting wherein an Owner of an I-SDD can Grant the Ownership of the I-SDD to another User, as a consequence, the Ownership changes.

Claim 14: The Intelligent Platform or method of operating an Intelligent Platform of Claim 11, and/or 12, and/or 13, and/or 31, and/or 32, and/or 33, wherein an Ownership could be a Joint-Ownership when there is more than one Owner to an I-SDD, and wherein a Joint-Ownership effectively executes as one Owner, depending on the type of Joint-Ownership, if and only if, but not limited to, when (a) all owners agreed, or (b) majority owners agreed, or (c) any one of the owners agreed, otherwise, the IP will reject execution or other attempt to access the I-SDD.

Claim 31: The Intelligent Platform or method of operating an Intelligent Platform of Claim 12, and/or 32, and/or 33, wherein a Permit may be further qualified by additional Terms and Conditions, such as, but not limited to, Permit will be terminated after certain time-limit, Permit will be terminated after occurrence of certain event, Permit will be terminated after certain occurrences of certain event, etc.

Claim 32: The Intelligent Platform of Claim 12, and/or 31, wherein the IP further qualifies a Permit by at least one additional Term and/or Condition.

Claim 33: The Intelligent Platform of Claim 32 wherein the Term and/or Condition comprises at least one of the following: Permit will be terminated after a certain time-limit, Permit will be terminated after occurrence(s) of certain event(s), and/or Permit will be terminated after certain occurrence(s) of certain event(s).

Claim 16: A method of operating an Intelligent Platform ("IP") comprising: employing an instantiation ("I-SDD") of an SDD comprising a computer software representation, to a User, of a Device, or of a subset of a Device, or of a derivative of a Device, or of an abstraction of a Device, in such a way that computer programs can use, reference, and interpret, wherein the I-SDD comprises Values of a set of Variables that reflect the Device State of interest at any given time, so that whenever the Value of a Variable in I-SDD is changed, it causes the Device to change to a different Device State.

Claim 17: The method of operating an Intelligent Platform of Claim 16, and/or 18, and/or 19, and/or 20, and/or 21, and/or 22, and/or 23, and/or 24, and/or 25, and/or 26, and/or 27, and/or 28, and/or 29, and/or 30, wherein a Device has one SDD or more and wherein the SDD is an abstraction of another SDD of the same Device, or a group of SDDs of several Devices.

Claim 18: The method of operating an Intelligent Platform of Claim 16, and/or 17, and/or 20, and/or 21, and/or 22, and/or 23, and/or 24, and/or 25, and/or 26, and/or 27, and/or 28, and/or 29, and/or 30, further including allowing more than just the 1st-Party to create, amend, and update a SDD of a Device, and also allowing either the 2nd-Party, or the 3rd-Party, or both Parties, to create, amend, and update a SDD of a Device.

Claim 19: The method of operating an Intelligent Platform of Claim 18 further including using a priority scheme to determine which Party can overwrite another Parties' SDD of a Device during the process of Vetting or publishing the (official) SDD.

Claim 20: The method of operating an Intelligent Platform of Claim 16, and/or 17, and/or 18, and/or 19, and/or 21, and/or 22, and/or 23, and/or 24, and/or 25, and/or 26, and/or 27, and/or 28, and/or 29, and/or 30, further including using a Vetting Process to determine when a SDD of a Device will become publicly (officially) available in the Platform.

Claim 21: The method of operating an Intelligent Platform of Claim 16, and/or 17, and/or 18, and/or 19, and/or 20, and/or 22, and/or 23, and/or 24, and/or 25, and/or 26, and/or 27, and/or 28, and/or 29, and/or 30, further including employing an Event Variable(s) or/and Notification Variable(s).

Claim 22: The method of operating an Intelligent Platform of Claim 16, and/or 17, and/or 18, and/or 19, and/or 20, and/or 21, and/or 23, and/or 24, and/or 25, and/or 26, and/or 27, and/or 28, and/or 29, and/or 30, further including employing I-SDD Creation.

Claim 23: The method of operating an Intelligent Platform of Claim 16, and/or 17, and/or 18, and/or 19, and/or 20, and/or 21, and/or 22, and/or 25, and/or 26, and/or 27, and/or 28, and/or 29, and/or 30, further including employing Visual Programming.

Claim 24: The method of operating an Intelligent Platform of Claim 23 wherein the Visual Programming includes employing a Trigger.

Claim 25: The method of operating an Intelligent Platform of Claim 16, and/or 17, and/or 18, and/or 19, and/or 20, and/or 21, and/or 22, and/or 23, and/or 24, and/or 30, further including employing a Permit for security and protection and enforcing such a Permit throughout the system.

Claim 26: The method of operating an Intelligent Platform of Claim 25 further including employing an Owner wherein the very first User who first bonds/registers a physical Device into the IP becomes the owner of a resulting I-SDD software representation of the corresponding Device of interest.

Claim 30: The method of operating an Intelligent Platform of Claim 16, and/or 17, and/or 18, and/or 19, and/or 20, and/or 21, and/or 22, and/or 23, and/or 24, and/or 25, and/or 26, and/or 27, and/or 28, and/or 29, further including employing Permit Obtaining and Checking wherein the Permit shall be obtained from a User and checked at every instance of a Program execution at any given time before an I-SDD is accessed or referenced each and every time.

Claim 27: The method of operating an Intelligent Platform of Claim 26, and/or 28, and/or 29, further including employing the action of Issuing wherein an Owner of an I-SDD can Issue a Permit to an User in the IP to access, to use, to manipulate, to reference, the I-SDD in a manner allowed by the type of the issued Permit.

Claim 28: The method of operating an Intelligent Platform of Claim 26, and/or 27, and/or 29, further including employing the action of Granting wherein an Owner of an I-SDD can Grant the Ownership of the I-SDD to another User, and as a consequence, the Ownership changes.

Claim 29: The method of operating an Intelligent Platform of Claim 26, and/or 27, and/or 28, wherein an Ownership could be a Joint-Ownership when there is more than one Owner to an I-SDD, and wherein a Joint-Ownership effectively executes as one Owner, depending on the type of Joint-Ownership, if and only if, but not limited to, when (a) all owners agreed, or (b) majority owners agreed, or (c) any one of the owners agreed, otherwise, the IP will reject execution or other attempt to access the I-SDD.

Claim 34: A computer-implemented method for controlling at least one device, in particular at least one electronic and/or mechanical device, wherein the method comprises: maintaining an Instantiation (I-SDD) of the computer software representation (SDD) of a device; and in response to a change in the I-SDD, causing the device to change to a different device state.

Claim 35: The method of Claim 34, wherein the method is performed by a data-processing device or system, or by a computer program, communicatively coupled to the at least one device via a communication network, in particular the Internet.

Claim 36: The method of Claim 34 and/or 35, wherein the step of maintaining an I-SDD of a device comprises employing an instantiation (I-SDD) of an SDD comprising the computer software representation of the device, or of a subset of the device, or of a derivative of the device, or of an abstraction of the device, preferably in such a way that computer programs can use, reference, and/or interpret, wherein the I-SDD preferably comprises values of a set of variables that reflect the device state of interest at any given time, so that whenever the value of a variable in the I-SDD is changed, it causes the device to change to a different device state.

Claim 37: The method of Claim 34 and/or 35 and/or 36 and/or 45 and/or 39 and/or 40 and/or 41 and/or 43 and/or 42 and/or 44, further comprising: allowing more than just a 1st party, in particular a device manufacturer, to create, amend and/or update a SDD of a device, and also allowing either a 2nd party, in particular a platform operator, or a 3rd party, in particular a user, or both parties, to create, amend and/or update a SDD of a device.

Claim 38: The method of Claim 37, further comprising: using a priority scheme to determine which party can overwrite another parties' SDD of a device, preferably during a process of vetting and/or publishing the (official) SDD.

Claim 39: The method of Claim 34 and/or 35 and/or 36 and/or 45 and/or 37 and/or 38 and/or 40 and/or 41 and/or 43 and/or 42 and/or 44, further comprising: using a vetting process to determine when a SDD of a device will become publicly (officially) available.

Claim 40: The method of Claim 34 and/or 35 and/or 36 and/or 45 and/or 37 and/or 38 and/or 39, further comprising at least one of: employing one or more event variables and/or one or more notification variables; employing an I-SDD creation process; employing visual programming, preferably comprising employing one or more triggers; and/or employing a permit for security and/or protection and/or enforcing such a permit throughout the system.

Claim 41: The method of Claim 40 and/or 43, further comprising: employing an owner wherein the very first user who first bonds and/or registers a device becomes the owner of a resulting I-SDD software representation of the corresponding device of interest.

Claim 42: The method of Claim 41, further comprising at least one of: employing the action of issuing, wherein an owner of an I-SDD can issue a permit to another user to access, use, manipulate and/or reference the I-SDD in a manner allowed by the type of the issued permit; and/or employing the action of granting, wherein an owner of an I-SDD can grant the ownership of the I-SDD to another user, and as a consequence, the ownership changes; and/or wherein an ownership is a joint-ownership when there is more than one owner to an I-SDD, and wherein a joint-ownership effectively executes as one owner, depending on the type of joint-ownership, if and only if, but not limited to, when (a) all owners agreed, (b) majority owners agreed, and/or (c) any one of the owners agreed, otherwise, rejecting execution or other attempts to access the I-SDD.

Claim 43: The method of Claim 40, and/or 41 and/or 42 and/or 44, further comprising: employing permit obtaining and/or checking, wherein the permit shall be obtained from a user and/or checked at every instance of a program execution at any given time before an I-SDD is accessed and/or referenced, preferably each and every time.

Claim 44: The method of Claim 42, further comprising: employing a permit qualified by terms and conditions, such as defining that the permit will be terminated after certain time-limit, will be terminated after occurrence of certain event and/or will be terminated after certain occurrences of certain event.

Claim 45: The method of Claim 34-35, and/or 37, and/or 38, and/or 39, and/or 40, and/or 41, and/or 43, and/or 42, and/or 44, wherein the device comprises one or more of: circuits, processors, memory, sensors, LED, LCD, display, chips, knobs, switches, battery and/or solar cell; wherein the device is preferably associated with one or more SDDs, and/or wherein the SDD is an abstraction of another SDD of the same device, and/or wherein the SDD is associated with a group of SDDs of several devices.

Claim 46: A data-processing device or system, in particular a server, configured for performing the method of any one of Claims 34-45.

Claim 47: A computer program comprising instructions for implementing the method of any one of Claims 34-45.

Claim 48: A device, in particular an electronic and/or mechanical device, configured for being controlled by the method of any one of Claims 34-45.

BRIEF DESCRIPTION OF THE DRAWINGS

The following detailed description of exemplary non-limiting illustrative embodiments is to be read in conjunction with the drawings of which:

FIG. 9 shows another example Permit process.

DETAILED DESCRIPTION OF NON-LIMITING EMBODIMENTS

Figure 1:
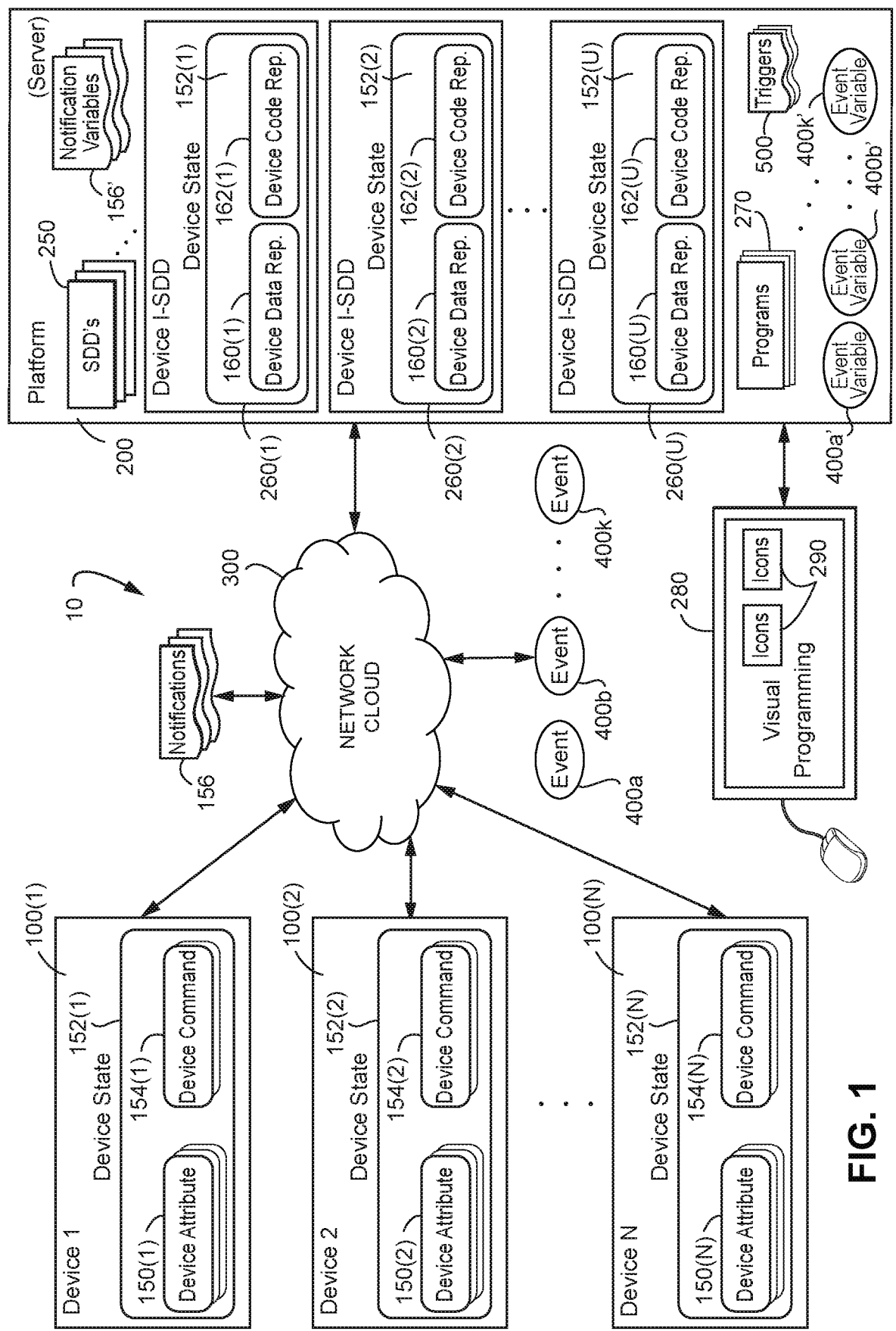
FIG. 1 is a block diagram of an example non-limiting system.
Figure 2:
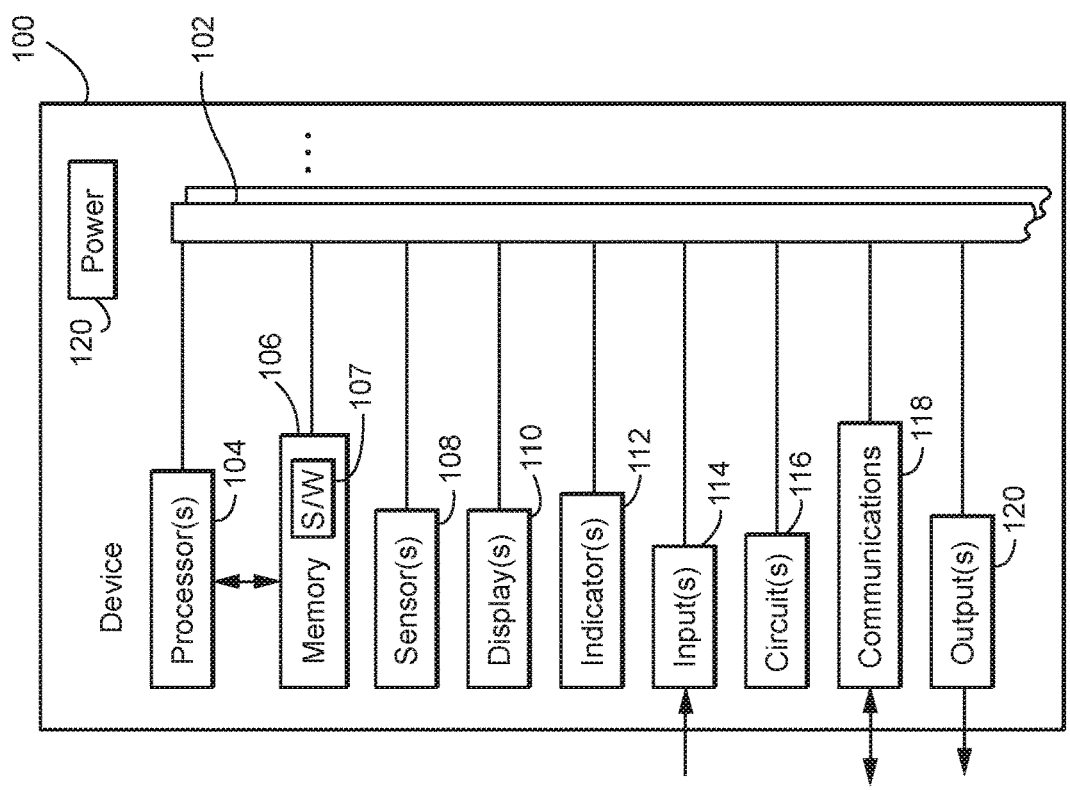
FIG. 2 is a block diagram of an example non-limiting Device.

FIG. 1 shows an example system 10 including one or more Devices 100 and a Platform 200. Each Device 100 is a thing made of or adapted for a particular purpose, especially a piece of mechanical or electronic equipment. It usually consists of, but not limited to, or a subset of, circuits, processors, memory, sensors, LED, LCD, display, chips, knobs, switches, battery, solar cell, etc. (see FIG. 2) There can be any number N of Devices 100. See FIG. 4A for non-limiting examples of Devices 100.

Device State 152

Each Device 100 has a Device State 152—which means the particular condition of interest, and/or mode of interest, that the Device is in at a particular time. To a User, it also means the collected state of the set of Device Attributes 150 or/and Device Commands 154 of interest of the Device 100 at a particular time. Thus, a Device 100, from the User point of view, usually consists of a set of Device Attributes 150 or/and Device Commands 154.

Device Attribute 150

A Device Attribute 150 is a feature, or quality, of interest regarded as a characteristic, or inherent part, of a device. For example, it could be, but not limited to, a knob, a button, an on/off switch, a meter, a meter for pressure, a sensor for motion, a programmable sequencer, a timer, a status indicator, a controller joystick, a readout screen, or a slider, etc.

Device Command 154

A Device Command 154 gives a device 100 an order to do something, or perform certain function; or, reversely, a device 100 reports state changes, or/and issues a device command 154, to a computer software, or other devices. For example, it could be, but not limited to, read meter, write status register, set on, set off, signal the-limit-is-reached, etc.

Platform 200

Figure 3:
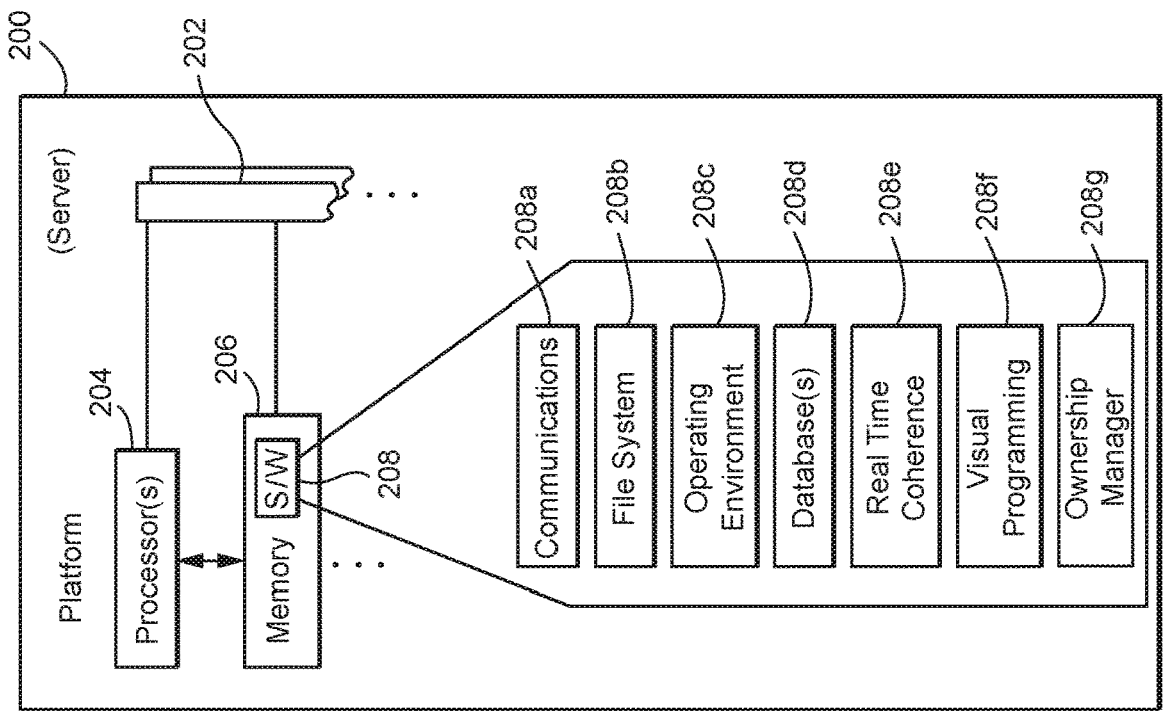
FIG. 3 is a block diagram of an example non-limiting Platform.

FIG. 1 also shows a Platform 200. Platform 200 is a major piece of software, as an operating environment, and/or operating environment in the cloud, and/or a database, and/or a database in the cloud, under which various software programs, and applications can be designed to run within, obeying its constrains and rules, and making use of its facilities, by many different users. See FIG. 3. In this context, a Program means, a computer program, a sequence of instructions, that a computer can interpret and execute, that tell a computer what to do. A Computer Program is written in a programming language, which has syntactic rules to govern how a program is allowed to form from one or more lexical tokens.

SDD's 250

Platform 200 supports Software-Defined Devices ("SDD's") 250. An SDD 250 is a computer software representation, to a User, of a Device 100, or of a subset of a Device, or of a derivative of a Device, or of an abstraction of a Device, in such a way that computer programs can use, reference, and interpret.

An SDD 250 could consist of "Device Data Representation" 160 and "Device Code Representation" 162, or could just have Device Data Representation 160.

A Device Data Representation 160 is a computer programming representation of a Device State 152 of interest. It could consist of, but not limited to, Variables representing Device Attributes 150 and/or Device Commands 154. Through these Variables, a Device State of interest could be interacted, manipulated, controlled, referenced, or used. In this context, a Variable means a place holder in the computer storage, such as memory or/and disk. It is defined within the rules of the employed computer language, or a group of related programs, or an operating environment, or the Platform. The interpretation of the content in a Variable is performed according to the data type declaration, such as integer, floating point, character string, pointer, record, variable-length record, etc., of the particular computer language used, or/and a cluster of related programs, or/and the particular operating environment, or/and the Platform 200. The lifespan of a Variable could be within the lifespan of a program, or a group of related programs, or the operating environment, or the Platform 200.

A SDD 250 could also consist of programming codes ("Device Code Representation 162") which extract from a selected set of Device Attributes 150, or/and Device Commands 154, on a Device 100 and transform them into the corresponding Device Data Representation. Reversely, Device Code Representation 162 could also extract the Values from a selected set of Device Data Representation(s) 160 and transform them into the corresponding Device Attributes 150 or/and Device Commands 154. Thus, it transforms to and from in between a Device 100 and the corresponding Device Data Representation 160. In this context, a Value means the interpreted content of a Variable, based on its declared data type of the employed language, or a group of related programs, or/and the operating environment, or/and the Platform 200.

A Device 100 may have more than one SDD 250, if so desired. A SDD 250 could be an abstraction of another SDD, or a group of SDDs.

Figure 6:
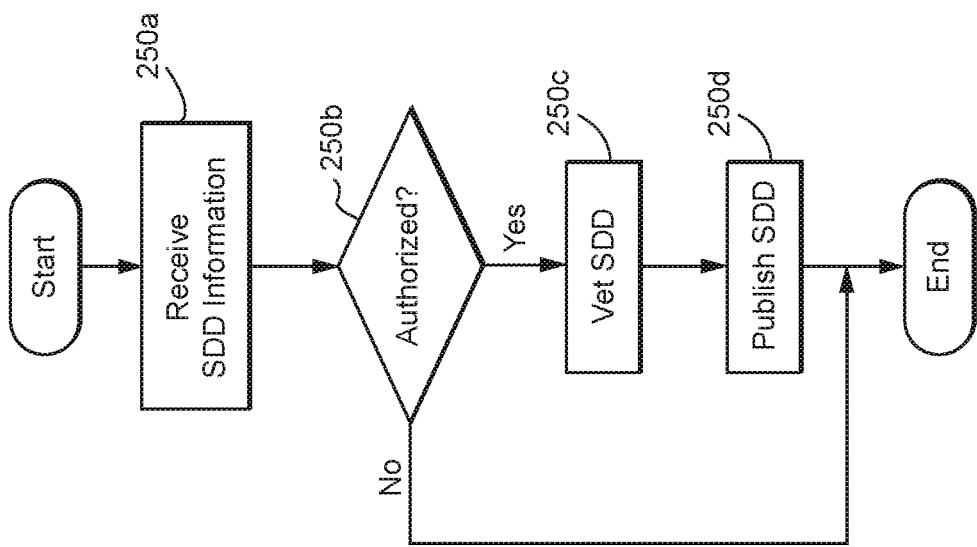
FIGS. 5 and 6 are example non-limiting Platform processes.

FIG. 6 shows an example of publishing an SDD 250. The Platform 200 receives a SDD Information (250a) and determines whether the attempt to publish is authorized (205b). If authorized, the Platform vets the SDD 250 (250c). The Vetting Process means the act and a particular process of making a prior examination and critical appraisal of something of particular interest. Once vetted, the SDD 250 is published (250d). In the context of Vetting, $1^{st}$ Party—means the Device manufacturer, $2^{nd}$-Party—means the Platform operator, and $3^{rd}$-Party—means a User of the Platform. Different Vetting privileges could apply to different Parties, such as, but not limited to, the $1^{st}$-Party can over write the $2^{nd}$-Party, and the $2^{nd}$-Party can over write the $3^{rd}$-Party.

I-SDD's 260

FIG. 1 also shows Instances of SDDs ("I-SDDs") 260. I-SDD 260 is an instantiation of a SDD 250, or an instantiation of the Device Data Representation 160 of a SDD, of a particular Device 100. At any given time, the Values of the Variables in Device Data Representation 160 of an I-SDD 260 (of the corresponding Device 100 in the Platform 200) shall reflect, or be the best estimated of, the Device State 152 of interest of a corresponding Device 100.

Thus, these I-SDDs 260 are independent from one another of the Devices 100 with the same SDD 250 (for example: having the same manufacture and model, but different physical Devices with different serial numbers). Different Devices 100 possess their own instantiations of the SDD 250. See FIG. 4B showing non-limiting examples of I-SDD's 260 corresponding to Devices 100 of FIG. 4A.

Figure 4A:
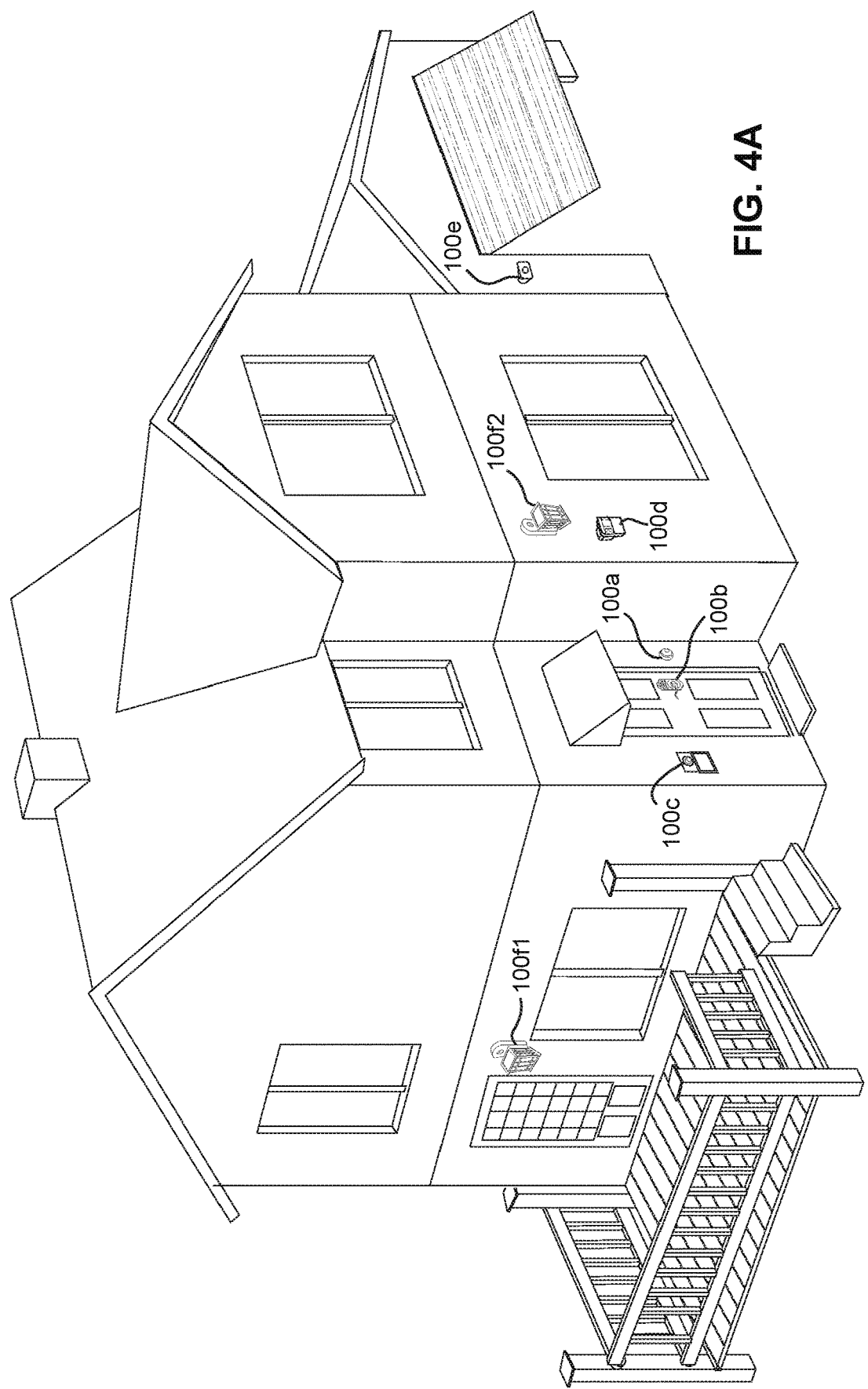
FIGS. 4A and 4B show an example application.

In more detail, FIG. 4A shows example non-limiting structures as follows:
"100" denotes it's a "device", and
"a" denotes a digital door bell,
"b" denotes a digital lock,
"c" denotes a digital monitor,
"d" denotes a digital alarm,
"e" denotes a digital controlled lighting, and
"f" denotes a digital controlled wall sconce.

Figure 4B:
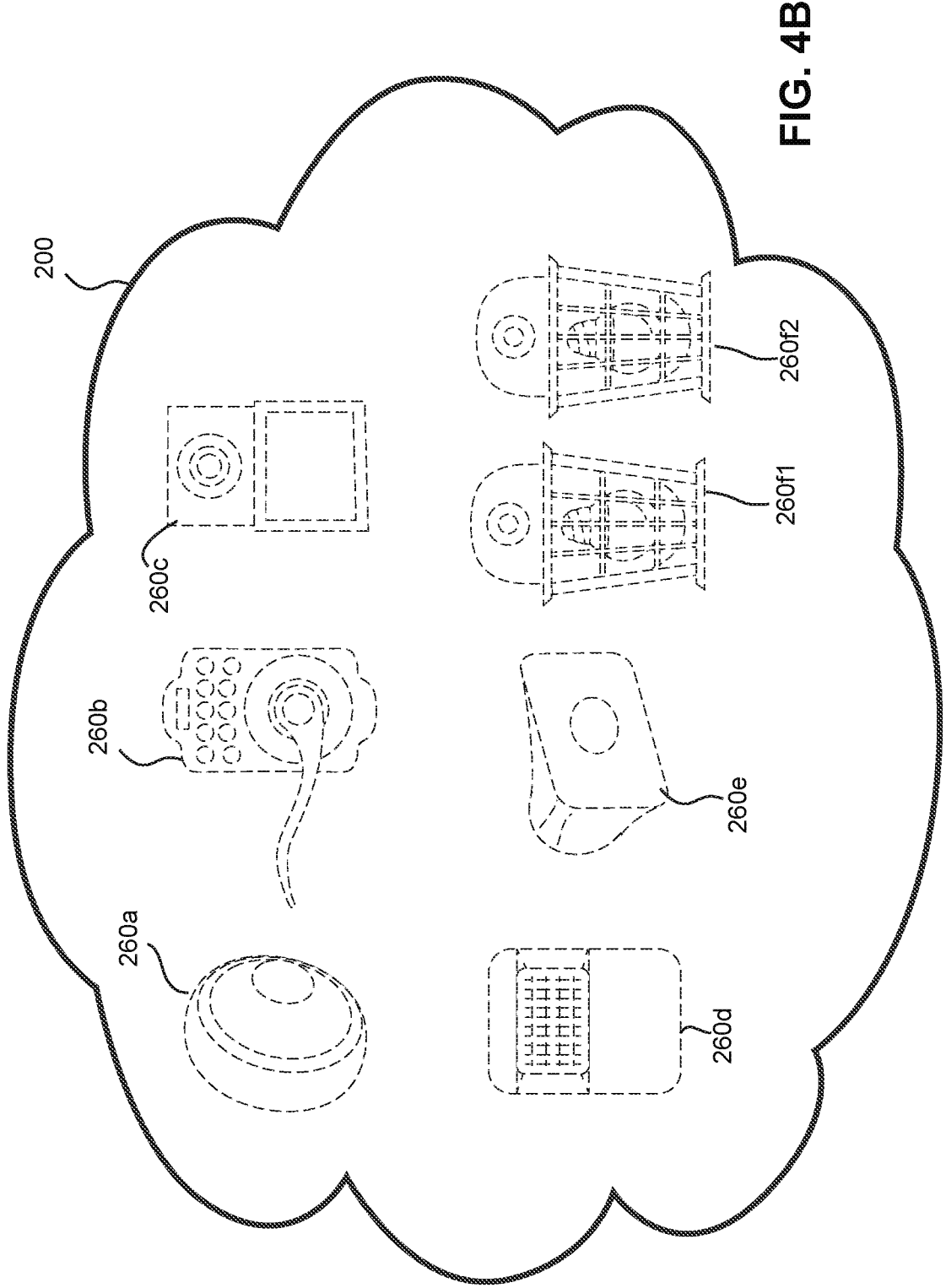

In FIG. 4B:
"200" denotes the Intelligent Platform in the Cloud, and
"260" denotes an I-SDD of the corresponding device; thus,
"260a" denotes the I-SDD of the corresponding "device a" of FIG. 4A in the Platform; here it is a digital door bell;
"260b" denotes the I-SDD of the corresponding "digital lock" of FIG. 4A in the Platform;
"260c" denotes the I-SDD of the corresponding "digital monitor" of FIG. 4A in the Platform;
"260d" denotes the I-SDD of the corresponding "digital alarm" of FIG. 4A in the Platform;
"260e" denotes the I-SDD of the corresponding "digital controlled lighting" of FIG. 4A in the Platform;
"260f/1" denotes the I-SDD of 1 of the 2 "digital controlled wall sconces" of FIG. 4A in the Platform;
"260f/2" denotes the I-SDD of the other one of the two "digital controlled wall sconces" of FIG. 4A in the Platform.

Figure 1A:
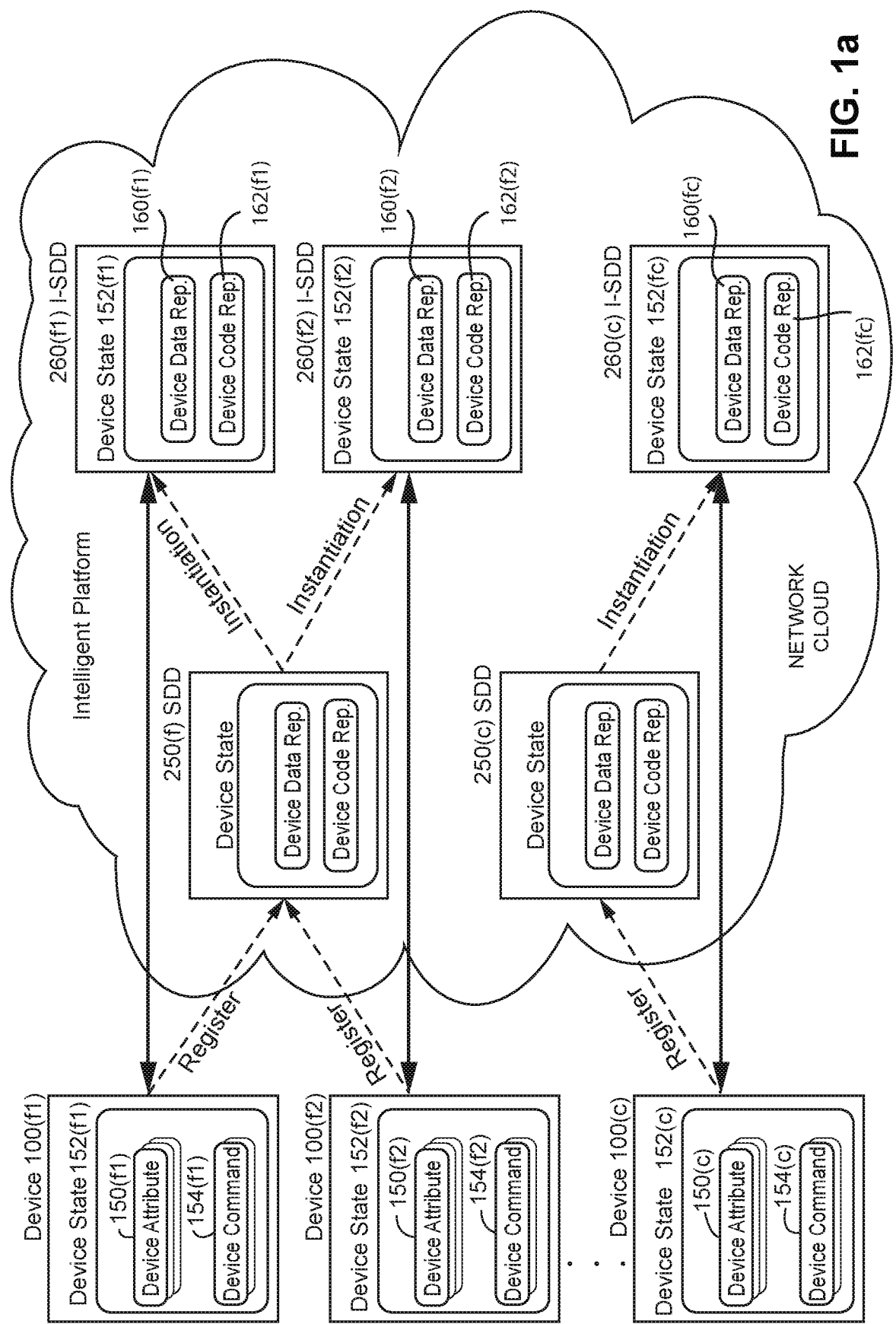
FIG. 1a shows example relationships between Devices, SDD's and I-SDD's.

Notice that, 260f/1 and 260f/2 have the same SDD, i.e. 250f in FIG. 1A, but they are two different Instantiations. They are the two Instantiations I-SDDs of the same SDD representing "digital wall sconce" in FIG. 4B, since they comprise two of the Same physical "digital controlled sconce" devices in FIG. 4A.

The Platform 200 will use the best efforts to mirror the Values of an I-SDD 260 to its corresponding Device State 152 of interest, once a Device is registered, bounded, mapped, or associated with a SDD 250 in the Platform, whenever this Device 100 is connected, directly or indirectly, to the Platform. When this Device 100 is disconnected, directly or indirectly, but not deleted, a best estimation of the Values of an I-SDD 260 could be used by the Platform 200.

Thus, as far as a programmer or an application on the Platform 200 is concerned, the corresponding I-SDD 260 of a Device 100 is the software representation, or reincarnation, of the Device 100 (or, group of Devices), or the best estimation of the Device (or, group of Devices), or the best derivative of the Device (or, group of Devices), or the best abstraction of the Device (or, group of Devices). It means that the Values of a set of Variables in an I-SDD 260 shall reflect the Device State 152 of interest at any given time; vice versa, it also means whenever the Value of a Variable in I-SDD is changed, it could cause the Device 100 to change to a different Device State 152.

An I-SDD 260 of a corresponding Device 100 will be created, kept, and maintained in the Platform 200 whenever a Device 100 is registered, and subscribed into the Platform. See FIG. 1a. It also means a set of Values (of Variables in I-SDD 260) will be initialized, kept, and maintained at any given time in the I-SDD to reflect the Device State 152 of interest of this particular Device 100. FIG. 1 shows I-SDDs 260(1)-260(U) where U>=N since there could be more than one I-SDD per Device 100.

Events 400

Events 400 means something, especially something of importance, happens, which is external to the device such as, but not limited to, temperature, time of date, altitude and longitude, a phone call occurs, when a phone call occurs, etc., or is derived in conjunction with a device, another device, a collective set of devices, or/and Platform facilities, such as, but not limited to, location, proximity, time zone, country, population, or weather, etc.

Event especially means changes or activities that are not controllable within the abilities of a Platform, e.g., turning on/off of weather, or controlling an earthquake.

An Event Variable 400'—means an Event 400, or a derivation of an Event (or Events), or a derivation of an Event (or Events) of interest, or a derivation of the history of an Event (or Events) of interest, is defined, represented, reincarnated, as a Variable in the Platform 200.

The Platform 200 will use the best efforts to mirror, reflect, assimilate, derive the Value of an Event Variable 400' to its corresponding Event (or Events) 400 or/and Platform facilities.

Notifications 156

Notification 156 is a type of message such as, but not limited to, text strings, sent to a device 100 by a software application in the Platform 200, or from a Device, or from outside of the Platform through a Network Cloud 300. A User could receive many Notifications 156, from various applications, on a Device 100 owned or used by the User. Notification 156 usually, but not limited to, is sent without a specific request from the client.

Notification Variables 156'—mean a Notification (or Notifications), or the derivation of a Notification (or group of Notifications) such as, but not limited to, whether a string of defined characters is matched, or the derivation of the relevant history of the Notification 156 (or, group of Notifications) such as, but not limited to, how many times a Notification 156 (or Notifications) being sent by a particular person, or by a particular software application, is represented, or reincarnated, as a Variable in the Platform 200.

The Platform 200 will use the best efforts to mirror, reflect, assimilate, derive the Value of a Notification Variable to its corresponding Notification (or Notifications) or/and Platform facilities.

Triggers 500

Triggers 500 means whenever the Value of an Variable of interest in an I-SDD 260, or Event Variables, or Notification Variables, changes, it causes the affected Programs (i.e., Programs use this Variable, or/and waiting on this Variable, or/and are related to this particular Variable) to be executed by the Platform 200 in a manner within the rules of the Platform, or/and by the programmable control of a user. The User function of Trigger 500 could be, but not limited to, designed as a language construct, or a function call in the runtime library, or a system/Platform call in the Platform 200.

Figure 5:
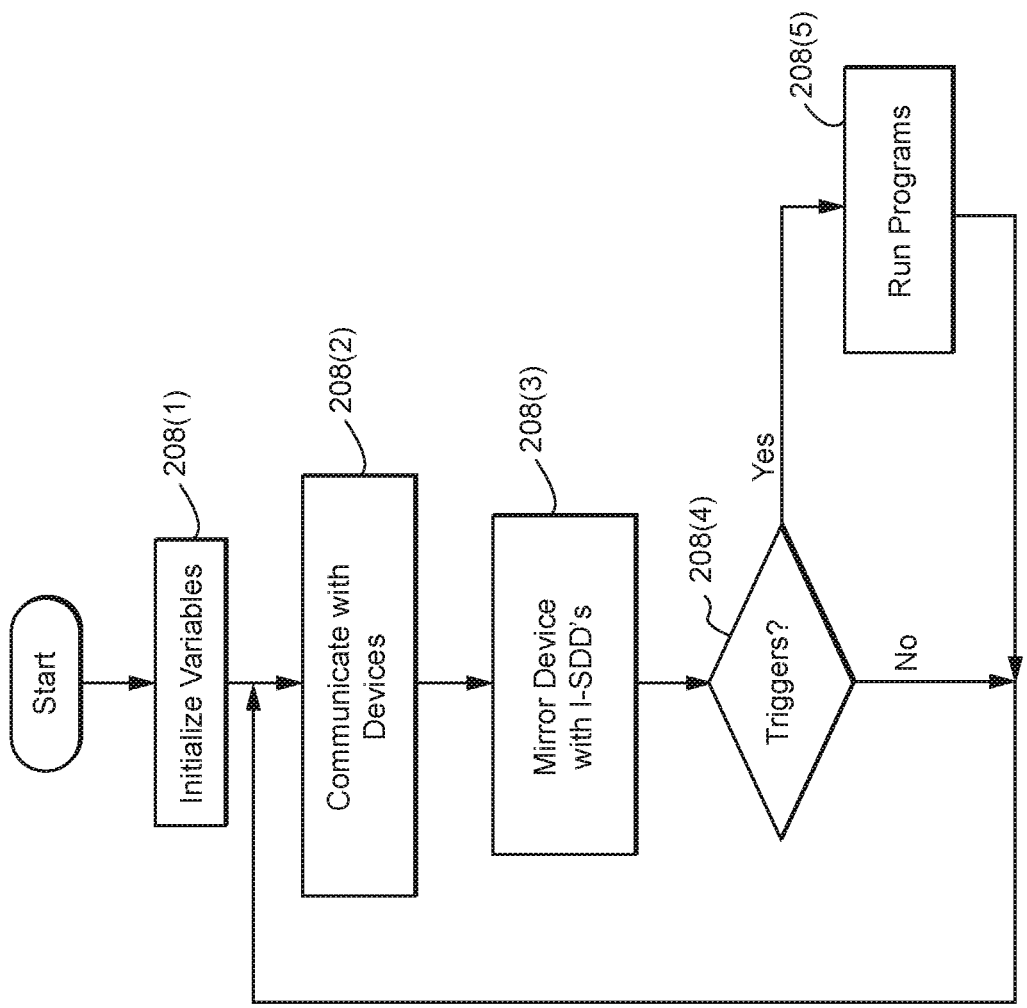

FIG. 5 shows an example non-limiting Platform process that uses Triggers 500. The Platform 200 initializes Variables (208(1)) and then communicates with Devices 100 (208(2)). The Platform 200 mirrors each Device 100 with one or more corresponding I-SDDs 260 (208(3)). The Platform 200 then detects if there are any applicable Triggers 500 (208(4)). If there are, the Platform 200 runs appropriate Programs (208(5)) as described above.

Visual Programming 280

Some of the software programs and applications that execute on Platform 200 can be created using Visual Programming 280. Visual Programming 280 means a Program is put together by stitching one or more Icons together, in one, two-, or three-dimensional space, in accordance with the language rules of the programming language. In this context, an icon means a graphical symbol that represents a programming language construct. A language construct could mean a language construct, a component of a construct, or a collection of components of a construct, or a collection of constructs. Usually, a distinct Icon, such as, but not limited to, by shape, or/and color, or/and shade, or/and stenciled symbolic name stenciled on the shape, etc., is designed for a particular construct of interest. Furthermore, the editor for a Visual Programming usually has the capabilities to allow a programmer, through drag and drop, to insert, remove, manipulate placement of Icons in accordance with the rules of the employed language, in turns, to form a Program.

Example Security & Protection

Protected Object is an object of interest, in the Platform 200, which the Platform wants to protect and secure. For example, it could be, but not limited to, a User, a User's private data, or/and the Variable(s) of an I-SDD 260, or/and an I-SDD, or/and Event Variables, or/and Notification Variables, or/and a physical Device 100. In this context, a User is a user of the Platform.

Permit

To protect the Objects in a system, a system in general uses (1) predefined address-space privileges, or so called hierarchical protection domains, such as Unix, Linux, etc. Depending on the type of user, they are pre-assigned a privilege to access the (1) permitted address-space(s) and the objects in the permitted address-space(s) and/or (2) access-control list associated with an object, such as a commercial database. The access-control list is associated with an Object, not the user. When a program tries to access such an Object, the system checks what the user's privilege is in the access-control list to decide whether the access shall be granted.

In a Platform 200 using Permits, a program obtains the Permit from the User's Permit List and, in turn, uses the obtained Permit to reference/access the object in accordance with the rights that are specified by that Permit. In principle, there are many similarities between Permit and Capability (of a Capability-based system). See e.g., https://en.wikipedia.org/wiki/Capability-based_security, incorporated herein by reference.

A User needs a proper Permit to access (i.e., use, manipulate, or reference) a Protected Object in the Platform 200. See FIG. 9. Without a proper Permit, the Platform 200 prohibits a User, or a Program (or a segment of a Program) on behalf of the User, to access/use/manipulate/reference a Protected Object of interest ("No" exit to FIG. 9 decision block). The Platform 200 maintains a List of Permits for each User.

Owner (Ownership)

Figure 7:
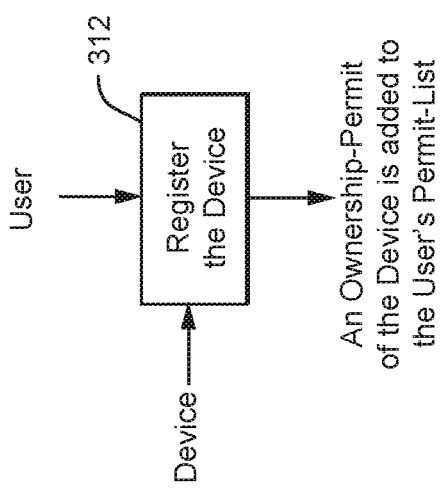
FIG. 7 shows an example Device registration process.

The very first User who first bonds/registers a physical Device 100 into the Platform 200, in turn, becomes the owner of the resulting I-SDD 260, i.e., the software representation of the corresponding Device of interest. See FIG. 7.

Issue

Figure 8:
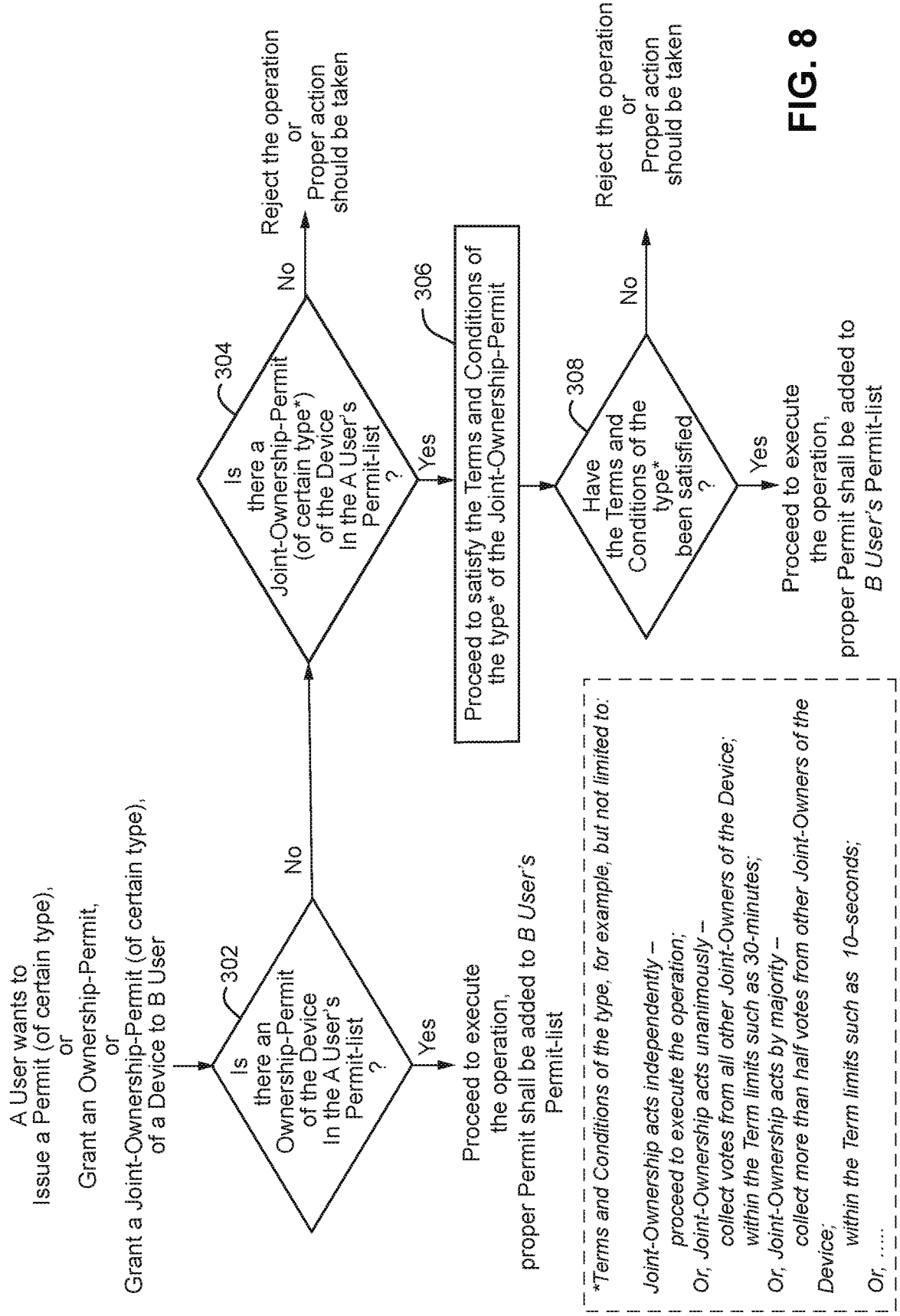
FIG. 8 shows an example Permit process.

An Owner, or a software on the behalf of the Owner, of an I-SDD 260 can Issue, or respond to a valid request to Issue, a Permit to a User in the Platform 200 to access, to use, to manipulate, to reference, the I-SDD in a manner allowed by the type of the issued Permit. Types (such as, but not limited to, Read, Write, Access with Terms and Conditions, Access with certain time-limit, or Access being terminated after certain event(s), etc.) of Permit could be created depending on the Platform Operators. FIG. 8 shows examples.

Grant

An Owner, or a software on the behalf of the Owner, of an I-SDD 260 can Grant, or respond to a valid request to Grant, the Ownership of the I-SDD to another User; as a consequence, the Ownership changes. The Grantor could lose the Ownership of the I-SDD 260 to the Grantee, or could become a Joint-Owner (Joint-Ownership), with the Grantee, of the I-SDD.

Permit Obtaining and Checking

A Permit shall be obtained from a User, or a software on the User's behalf, and checked (i.e., at every instance of a Program execution at any given time) before an I-SDD 260 is accessed or referenced each and every time. For example, if a Program tries to access an I-SDD 260 in two different times, before each access, a proper Permit from the User, or a software on the User's behalf, has to be obtained and checked; in other words, a proper Permit shall be obtained and checked for the first access, and it shall be obtained and checked again for the second access.

In the FIG. 8 example, User A wants to Issue a Permit (of certain type) or Grant an Ownership-Permit, or Grant a Joint-Ownership-Permit (of certain type), of a Device to User B. The Platform 200 determines if there is an Ownership-Permit of the Device in the A User's Permit-list (decision block 302). If there is an Ownership-Permit of the Device in the A User's Permit-list. ("Yes" exit to decision block 302), the Platform 200 proceeds to execute the operation; and a proper Permit shall be added to B User's Permit-list.

If there is not an Ownership-Permit of the Device in the A User's Permit-list ("No" exit to decision block 302), the Platform 200 determines if there is a Joint-Ownership-Permit (of certain type) of the Device in the A User's Permit-list (decision block 306).

If the Platform 200 determines there is not a Joint-Ownership-Permit (of certain type) of the Device in the A User's Permit-list ("No" exit to decision block 306), the Platform rejects the operation or proper action should be taken.

If the Platform 200 determines there is a Joint-Ownership-Permit (of certain type) of the Device in the A User's Permit-list ("Yes" exit to decision block 306), the Platform proceeds to satisfy the Terms and Conditions of the type of the Joint-Ownership-Permit. In this context, the Terms and Conditions of the type for example may include but not be limited to:

Joint-Ownership acts independently—proceed to execute the operation,

Or, Joint-Ownership acts unanimously—collect votes from all other Joint-Owners of the Device; within the Term limits such as 30-minutes, Or, Joint-Ownership acts by majority—collect more than half votes from other Joint-Owners of the Device; within the term limits such as 10-seconds, Or, . . . .

The Platform 200 then determines whether the Terms and Conditions of the type have been satisfied (decision block 308). If they have not been satisfied ("No" exit), the Platform 200 rejects the operation or proper action should be taken. If the Terms and Conditions of the type have been satisfied ("Yes" exit of decision block 308), the Platform proceeds to execute the operation, and adds the proper Permit to the B User's Permit-list.

The invention is not to be limited to the disclosed embodiments, but on the contrary, is intended to cover various modifications and equivalent arrangements included within the spirit and scope of the claims.

Glossary/Definitions

Applicant intends to be his own lexicographer with respect to the following definitions which will apply to (and only to) the capitalized following terms (i.e., those with an initial letter that is capitalized). These definitions will not apply to the same terms that do not begin with a capital letter. For example, "User" is a defined term, whereas "user" is not a defined term.

| Defined Term: | Definition: |
| --- | --- |
| "1st-Party" or "First Party" | the Device manufacturer |
| "2nd-Party" or "Second Party" | a Platform operator |
| "3rd-Party" or "Third Party" | a user of the Platform |
| "Device Attribute" | a feature, or quality, of interest regarded as a characteristic, or inherent part, of a device. For example, a Device Attribute could be, but not limited to, a knob, a button, an on/off switch, a meter, a meter for pressure, a sensor for motion, a programmable sequencer, a timer, a status indicator, a controller joystick, a readout screen, or a slider, etc. |
| "Device Code Representation" | A SDD could also consist programming codes ("Device Code Representation") which extract from a selected set of Device Attributes, or/and Device Commands, on a Device and transform them into the corresponding Device Data Representation. Reversely, Device Code Representation could also extract the Values from a selected set of Device Data Representation and transform them into the corresponding Device Attributes or/and Device Commands. Thus, it transforms to and from (in between) a Device and the corresponding Device Data Representation. |
| "Device Data Representation" | a computer programming representation of a Device State of interest. It could consist of, but not limited to, Variables representing Device Attributes and/or Device Commands. Through these Variables, a Device State of interest could be interacted, manipulated, controlled, referenced, or used. |
| "Device Command" | to give a device an order to do something, or perform a certain function(s); or, reversely, a device reports state changes, and/or issues a device command, to a computer software, or other device(s). For example, it could be, but not limited to, read meter, write status register, set on, set off, signal the-limit-is-reached, etc. |
| "Device State" | the particular condition of interest, and/or mode of interest, that a Device is in at a particular time. To a User, it also means the collected state of the set of Device Attributes or/and Device Commands of interest of the Device at a particular time. |
| "Device" | a thing made of or adapted for a particular purpose, especially a piece of mechanical or electronic equipment. It usually consists of, but is not limited to, or a subset of, circuit(s), processor(s), memory(ies), sensor(s), LED(s), LCD(s), display(s), chip(s), knob(s), switch(es), battery(ies), solar cell(s), etc. A Device, from the User point of view, usually consists of a set of Device Attributes or/and Device Commands. |
| "Event Variable" | an Event, or a derivation of an Event (or Events), or a derivation of an Event (or Events) of interest, or a derivation of the history of an Event (or Events) of interest, is defined, represented, or/and reincarnated, as a Variable in the Platform. The Platform will use the best efforts to mirror, reflect, assimilate, derive the Value of an Event Variable to its corresponding Event (or Events) or/and Platform facilities. |
| "Event" | something, especially something of importance, happens, which is external to the device such as, but not limited to, temperature, time of day/date, location (e.g., altitude and latitude/longitude or other geocoordinates), a phone call occurs, when a phone call occurs, etc., or is derived in conjunction with a device, another device, a collective set of devices, or/and Platform facilities, such as, but not limited to, location, proximity, time zone, country, population, or weather, etc. Event especially means changes or activities that are not controllable within the abilities of a Platform, e.g., turning on/off of weather, or controlling an earthquake. |
| "Grant" | An Owner, or a software on the behalf of the Owner, of an I-SDD can Grant, or respond to a valid request to Grant, the Ownership of the I-SDD to another User, as a consequence, the Ownership changes. The Grantor could lose the Ownership of the I-SDD to the Grantee, or could become a Joint-Owner (Joint-Ownership), with the Grantee, of the I-SDD. |
| "Icon" | a graphical symbol that represents a programming language construct. A programming construct could mean a language construct, a component of a construct, or a collection of components of a construct, or a collection of constructs. Usually, a distinct Icon, such as, but not limited to, by shape, or/and color, or/and shade, or/and symbolic name stenciled on the shape, etc., is designed for a particular construct of interest. |
| "An Instance of a SDD" ("I-SDD") | an instantiation of a SDD, or an instantiation of the Device Data Representation of a SDD, of a particular Device. At any given time, the Values of the Variables in Device Data Representation of an I-SDD (of the corresponding Device in the Platform) shall reflect, or be the best estimate of, the Device State of interest of a corresponding Device. |

-continued

| Defined Term: | Definition: |
|---|---|
| | Thus, these I-SDDs are independent from one another of the Devices with the same SDD (for example: having the same manufacture and model, but different physical Devices with different serial numbers). Different Devices possess their own instantiations of the SDD. The Platform will use the best efforts to mirror the Values of an I-SDD to its corresponding Device State of interest, once a Device is registered, bounded, mapped, or associated with a SDD in the Platform, whenever this Device is connected, directly or indirectly, to the Platform. When this Device is disconnected, directly or indirectly, but not deleted, a best estimation of the Values of an I-SDD could be used by the Platform. Thus, as far as a programmer or an application on the Platform is concerned, the corresponding I-SDD of a Device is the software representation, or reincarnation, of the Device (or, group of Devices), or the best estimation of the Device (or, group of Devices), or the best derivative of the Device (or, group of Devices), or the best abstraction of the Device (or, group of Devices). It means that the Values of a set of Variables in an I-SDD shall reflect the Device State of interest at any given time; vis versa, it also means whenever the Value of a Variable in I-SDD is changed, it could cause the Device to change to a different Device State. |
| "I-SDD Creation" | an I-SDD of a corresponding Device will be created, kept, and maintained in the Platform whenever a Device is registered, or/and subscribed into the Platform. It also means a set of Values (of Variables in I-SDD) will be initialized, kept, and maintained at any given time in the I-SDD to reflect the Device State of interest of this particular Device. |
| "Intelligent Platform" ("IP") | comprises a Platform that employs an I-SDD where the Values of a set of Variables in an I-SDD shall reflect the Device State of interest at any given time and vis versa so that whenever the Value of a Variable in the I-SDD is changed, it could cause the Device to change to a different Device State. In this context, an I-SDD is an instantiation of a SDD, or an instantiation of the Device Data Representation of a SDD, of a particular Device. In this context, a Software-Defined Device ("SDD") means a computer software representation, to a User, of a Device, or of a subset of a Device, or of a derivative of a Device, or of an abstraction of a Device, in such a way that computer programs can use, reference, and interpret. |
| "Issue" | an Owner, or a software on the behalf of the Owner, of an I-SDD can Issue, or respond to a valid request to Issue, a Permit to a User in the Platform to access, to use, to manipulate, or/and to reference, the I-SDD in a manner |

-continued

| Defined Term: | Definition: |
|---|---|
| | allowed by the type of the issued Permit. |
| "Joint Ownership" | when there is more than one Owner to a Protected Object. A group of Joint Owners effectively executes as one Owner, depending on the type of Joint Ownership, if and only if, when (a) all Owners agreed, or (b) a majority of the Owners agreed, or (c) any one of the Owners agreed; otherwise, the execution (attempt to access the Protected Object, or Grant an Ownership, or Issue a Permit) will be rejected by the Platform. |
| "Notification Variable" | a Notification (or Notifications), or the derivation of a Notification (or group of Notifications) such as, but not limited to, whether a string of defined characters is matched, or the derivation of the relevant history of the Notification (or, group of Notifications) such as, but not limited to, how many times a Notification (or Notifications) being sent by a particular person, or by a particular software application, is represented, or reincarnated, as a Variable in the Platform. The Platform will use the best efforts to mirror, reflect, assimilate, or/and derive the Value of a Notification Variable to its corresponding Notification (or Notifications) or/and Platform facilities. |
| "Notification" | a type of message such as, but not limited to, text strings, sent to a device by a software application in the Platform, or from a Device, or from outside of the Platform through a Network Cloud. A User could receive many Notifications, from various applications, on a Device owned or used by the User. Notification usually, but not limited to, is sent without a specific request from the client. |
| "Owner" (Ownership) | The very first User who first bonds/registers a Device into the Platform, in turn, this User becomes the owner of the resulting I-SDD, i.e., the software representation of the corresponding Device of interest. |
| "Permit" | To protect the Objects in a system, a system in general uses (1) predefined address-space privileges, or so called hierarchical protection domains, such as Unix, Linux. Depending on the type of user, they are pre-assigned a privilege to access the permitted address-space(s) and the objects in the permitted address-space(s), or (2) access-control list associated with an object, such as a commercial database. The access-control list is associated with an Object, not the user. When a program tries to access such an Object, the system checks what the user's privilege is in the access-control list to decide whether the access shall be granted. In a Platform using Permits, a program obtains the Permit from the User's Permit List, in turn, uses the obtained Permit to reference/access the object in accordance with the rights that are specified by that Permit. In principle, there are many similarities between Permit and |

| Defined Term: | Definition: |
|---|---|
| | Capability (of a Capability-based system). A User needs a proper Permit to access (i.e., use, manipulate, or/and reference) a Protected Object in the Platform. Without a proper Permit, the Platform prohibits a User, or a Program (or a segment of a Program) on behalf of the User, from access/use/manipulate/ reference of a Protected Object of interest. The Platform maintains a List of Permits for each User. |
| "Permit Obtaining and Checking" | Permits shall be obtained from a User and checked (i.e., every instance of a Program execution at any given time) before an I-SDD is accessed or referenced each and every time. For example, if a Program tries to access an I-SDD at two different times, before each access, a proper Permit from the User has to be obtained and checked; in other words, a proper Permit shall be obtained and checked for the first access, and it shall be obtained and checked again for each of the second and subsequent accesses. |
| "Platform" | a major piece of software, such as an operating environment, and/or operating environment in the cloud, and/or a database, and/or a database in the cloud, under which various software programs, and applications can be designed to run within, obeying its constraints and rules, and making use of its facilities, by many different users. |
| "Program" | a computer program, a sequence of instructions, that a computer can interpret and execute, that tell a computer what to do. A Computer Program is written in a programming language, which has syntactic rules to govern how a program is allowed to form from one or more lexical tokens. |
| "Protected Object" | An object of interest, in the Platform, which the Platform wants to protect. For example, it could be, but not limited to, a User, a User's private data, or/and the Variable(s) of an I-SDD, or/and an I-SDD, or/and Event Variables, or/and Notification Variables, or/and a physical Device. |
| "Software-Defined Device" ("SDD") | a computer software representation, to a User, of a Device, or of a subset of a Device, or of a derivative of a Device, or of an abstraction of a Device, in such a way that computer programs can use, reference, and interpret. A SDD could consists of Device Data Representation and Device Code Representation, or could just have Device Data Representation. A Device may have more than one SDD, if so desired. A SDD could be an abstraction of another SDD, or a group of SDDs. |
| "Trigger" | whenever the Value of a Variable of interest in an I-SDD, or Event Variables, or Notification Variables, changes, it causes the affected Programs (i.e., Programs use this Variable, or/and waiting on this Variable, or/and are related to this particular Variable) to be executed by the Platform in a manner within the rules of the Platform, or/and by the programmable control of a user. The User function of Trigger could be, but not limited to, designed as a language construct, or a function call in the runtime library, or a system/Platform call in the Platform. |
| "User" | A user of the Platform |
| "Value" | the interpreted content of a Variable, based on its declared data type of the employed language(s), or a group of related programs, or/and the operating environment, or/and the Platform. |
| "Variable" | a place holder in non-transitory computer storage, such as memory and/or disk. "Variable" is defined within the rules of an employed computer language(s), a group of related programs, or an operating environment, or a Platform. The interpretation of the content in a Variable is performed according to the data type declaration, such as integer, floating point, character string, pointer, record, variable-length record, etc., of the particular computer language(s) used, or/and a cluster of related programs, or/and the particular operating environment, or/and the Platform. The lifespan of a Variable could be within the lifespan of a program, or a group of related programs, or the operating environment, or the Platform. |
| "Vetting Process" | the act and a particular process of making a prior examination and critical appraisal of something of particular interest. For example, a Vetting Process is used to determine when a SDD of a Device will become publicly (officially) in the Platform. |
| "Visual Programming" | a Program is put together by stitching one or more Icons together, in one, two-, or three-dimensional space, in accordance with the language rules of the programming language. Furthermore, the editor for a Visual Programming usually has the capabilities to allow a programmer, through drag and drop, to insert, remove, or/and manipulate placement of Icons in accordance with the rules of the employed language, in turns, to form a Program. |

The invention claimed is:

1. An Intelligent Platform ("IP") comprising:
a Platform including a processor employing an instantiation of a Software-Defined Device ("I-SDD") comprising a computer software representation, to a User, of at least one of:
(i) as Device,
(ii) a subset of a Device,
(iii) a derivative of a Device, and
(iv) an abstraction of a Device,
in such a way that computer programs can use, reference, and interpret,
wherein the I-SDD comprises Values of a set of Variables that reflect a Device State of interest at any given time, so that whenever a Value of a Variable in an I-SDD is changed, it causes the Device to change to a different Device State and, whenever the Device Changes to a different Device State, it causes the Value of a Variable in an I-SDD to change, the processor further employing I-SDD Creation and employing a Permit for security and protection and enforcing the Permit throughout the Platform; and, at least one of Objects protected by the Permit is an I-SDD; and the processor further employing Permit Obtaining and Checking wherein the Permit is obtained from a User and checked at every instance of a Program execution at any given time before an I-SDD is accessed or referenced each and every time.

2. The Intelligent Platform of claim 1 wherein the Platform is structured to provide at least one of the following:

(a) a Device has at least one Software-Defined Device (SDD) and wherein the SDD is an abstraction of at least another SDD of the Device;

(b) allowing more than just a 1st-Party to create, amend, and update a SDD of a Device, and also allowing either a 2nd-Party, or a 3rd-Party, or both $2^{nd}$ and $3^{rd}$ Parties, to create, amend, and update a SDD of a Device, wherein the method includes a priority scheme to determine which Party can overwrite another Party's SDD of a Device during the process of Vetting or publishing an official SDD;

(c) using the Vetting Process to determine when a SDD of a Device will become publicly officially available in the Intelligent Platform;

(d) employing an Event Variable(s) or/and Notification Variable(s);

(e) employing Visual Programming;

(f) employing Visual Programming wherein the Visual Programming includes employing a Trigger;

(g) using a color code such as green, red, yellow to reflect the status of at least one of an I-SDD, and the status of a Program, on an icon of a user interface of the Intelligent Platform.

3. The Intelligent Platform of claim 2 wherein the at least another SDD comprises a group of SDDs of several Devices.

4. An Intelligent Platform ("IP") comprising:
a Platform including a processor employing an instantiation of a Software-Defined Device ("I-SDD") comprising a computer software representation, to a User, of at least one of:
(i) a Device,
(ii) a subset of a Device,
(iii) a derivative of a Device, and
(iv) an abstraction of a Device,
in such a way that computer programs can use, reference, and interpret,
wherein the I-SDD comprises Values of a set of Variables that reflect a Device State of interest at any given time, so that whenever the Value of a Variable in an I-SDD is changed, it causes the Device to change to a different Device State and, whenever the Device Changes to a different Device State, it causes the Value of a Variable in the I-SDD to change,
the processor further employing I-SDD Creation and employing a Permit for security and protection and enforcing such a Permit throughout the Intelligent Platform; and, at least one of Objects Protected by the Permit is an I-SDD; and
wherein a Permit is further qualified by additional Terms and Conditions, and the Permit will be terminated after at least one of:
a certain time-limit,
after occurrence(s) of a certain event(s), and
after certain occurrence(s) of a certain event(s).

5. An Intelligent Platform ("IP") comprising:
a Platform including a processor employing an instantiation of a Software-Defined Device ("I-SDD") comprising a computer software representation, to a User, of at least one of:
(i) a Device,
(ii) a subset of a Device,
(iii) a derivative of a Device, and
(iv) an abstraction of a Device,
in such a way that computer programs can use, reference, and interpret,
wherein the I-SDD comprises Values of a set of Variables that reflect a Device State of interest at any given time, so that whenever the Value of a Variable in I-SDD is changed, it causes the Device to change to a different Device State and, whenever the Device Changes to a different Device State, it causes the Value of a Variable in an I-SDD to change,
the processor further employing I-SDD Creation, and
the processor further employing an Owner wherein the very first User who first bonds/registers a physical Device into the Intelligent Platform becomes the owner of a resulting I-SDD software representation of a corresponding Device of interest.

6. The Intelligent Platform of claim 5 further including the processor employing the action of Issuing that enables an Owner of an I-SDD to Issue a Permit to a User in the Intelligent Platform to access, to use, to manipulate, and to reference, the I-SDD in a manner allowed by a type of the issued Permit.

7. The Intelligent Platform of claim 5 further including the processor employing the action of Granting that enables an Owner of an I-SDD to Grant Ownership of the I-SDD to another User, and as a consequence, the Ownership changes.

8. The Intelligent Platform of claim 5 wherein an Ownership comprises a Joint-Ownership when there is more than one Owner of an I-SDD, and wherein a Joint-Ownership effectively executes as one Owner, depending on the type of Joint-Ownership, when and only, when at least one of (a) all owners agreed, (b) majority owners agreed, and (c) any one of the owners agreed, otherwise, the Intelligent Platform will reject execution or other attempt to access the I-SDD.

9. A method of operating an Intelligent Platform ("IP") comprising:
employing an instantiation of a Software-Defined Device ("I-SDD") comprising a computer software representation, to a User, of at least one of:
(i) a Device,
(ii) a subset of a Device,
(iii) a derivative of a Device, and
(iv) an abstraction of a Device,
in such a way that computer programs can use, reference, and interpret,
wherein the I-SDD comprises Values of a set of Variables that reflect a Device State of interest at any given time, so that whenever the Value of a Variable in I-SDD is changed, it causes the Device to change to a different Device State and, whenever the Device Changes to a different Device State, it causes the value of a Variable in an I-SDD to change, and
further including at least one of the following:
(a) a Device has at least one Software Defined Device (SDD) or more and wherein the SDD is an abstraction of at least another SDD of the Device;
(b) allowing more than just a 1st-Party to create, amend, and update a SDD of a Device, and also allowing either a 2nd-Party, or a 3rd-Party, or both $2^{nd}$ and $3^{rd}$ Parties, to create, amend, and update a SDD of a Device, wherein the method may includes a priority scheme to determine which Party can overwrite another Party's SDD of a Device during the process of Vetting or publishing an official SDD;

(c) using a Vetting Process to determine when a SDD of a Device will become publicly officially available in the Platform;

(d) employing an Event Variable(s) or/and Notification Variable(s);

(e) employing Visual Programming;

(f) employing Visual Programming wherein the Visual Programming includes employing a Trigger;

(g) using a color code such as green, red, yellow to reflect at least one of the status of an I-SDD and the status of a Program, on an icon of the user interface of the IP.

10. The method of claim 9 further including employing I-SDD Creation.

11. The method of claim 10 further including employing a Permit for security and protection and enforcing the Permit throughout the Intelligent Platform; and, at least one of Object Protected by the Permit is the I-SDD.

12. The method of claim 9 wherein the at least another SDD comprises a group of SDDs of several Devices.

13. A method of operating an Intelligent Platform ("IP") comprising:
    employing an instantiation of a Software-Defined Device ("I-SDD") comprising a computer software representation, to a User, of at least one of:
    (i) a Device,
    (ii) a subset of a Device,
    (iii) a derivative of a Device, and
    (iv) an abstraction of a Device,
    in such a way that computer programs can use, reference, and interpret,
    wherein the I-SDD comprises Values of a set of Variables that reflect a Device State of interest at any given time, so that whenever the Value of a Variable in an I-SDD is changed, it causes the Device to change to a different Device State and, whenever the Device Changes to a different Device State, it causes the value of a Variable in an I-SDD to change,
    employing I-SDD Creation,
    employing a Permit for security and protection and enforcing such a Permit throughout the Intelligent Platform; and, at least one Object Protected by the Permit is an I-SDD, and
    employing Permit Obtaining and Checking wherein the Permit is obtained from a User and checked at every instance of a Program execution at any given time before an I-SDD is accessed or referenced each and every time.

14. A method of operating an Intelligent Platform ("IP") comprising:
    employing an instantiation of a Software-Defined Device ("I-SDD") comprising a computer software representation, to a User, of at least one of:
    (i) a Device,
    (ii) a subset of a Device,
    (iii) a derivative of a Device, and
    (iv) an abstraction of a Device,
    in such a way that computer programs can use, reference, and interpret,
    wherein the I-SDD comprises Values of a set of Variables that reflect a Device State of interest at any given time, so that whenever the Value of a Variable in an I-SDD is changed, it causes the Device to change to a different Device State and, whenever the Device Changes to a different Device State, it causes the value of a Variable in an I-SDD to change,
    employing I-SDD Creation,
    employing a Permit for security and protection and enforcing the Permit throughout the Intelligent Platform; and, at least one Object Protected by the Permit is the I-SDD, and
    wherein a Permit is further qualified by additional Terms and Conditions, and the Permit will be terminated after at least one of a certain time-limit, after occurrence(s) of a certain event(s), and after certain occurrences of a certain event(s).

15. A method of operating an Intelligent Platform ("IP") comprising:
    employing an instantiation of a Software-Defined Device ("I-SDD") comprising a computer software representation, to a User, of at least one of:
    a Device,
    a subset of a Device,
    a derivative of a Device, and
    an abstraction of a Device,
    in such a way that computer programs can use, reference, and interpret,
    wherein the I-SDD comprises Values of a set of Variables that reflect a Device State of interest at any given time, so that whenever the Value of a Variable in the I-SDD is changed, it causes the Device to change to a different Device State and, whenever the Device Changes to a different Device State, it causes the value of a Variable in the I-SDD to change,
    employing I-SDD Creation, and
    employing an Owner wherein the very first User who first bonds/registers a physical Device into the Intelligent Platform becomes the owner of a resulting I-SDD software representation of the corresponding Device of interest.

16. The method of claim 15 further including employing the action of Issuing enabling an Owner of an I-SDD to Issue a Permit to a User in the Intelligent Platform to at least one of access, use, manipulate, and reference, the I-SDD in a manner allowed by a type of the issued Permit.

17. The method of claim 15 further including employing the action of Granting enabling an Owner of an I-SDD to Grant Ownership of the I-SDD to another User, and as a consequence, the Ownership changes.

18. The method of claim 15 wherein an Ownership comprises a Joint-Ownership when there is more than one Owner to an I-SDD, and wherein a Joint-Ownership effectively executes as one Owner, depending on the type of Joint-Ownership, when and only when at least one of (a) all owners agreed, (b) majority owners agreed, and (c) any one of the owners agreed, otherwise, the Intelligent Platform will reject execution or other attempt to access the I-SDD.

* * * * *